United States Patent Office 3,721,476
Patented Mar. 20, 1973

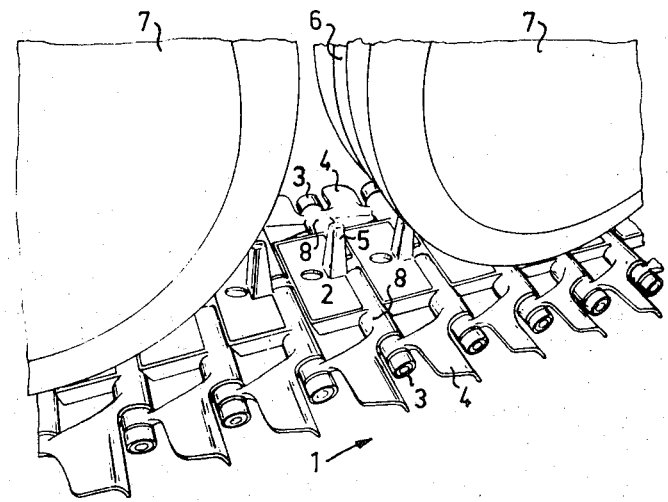
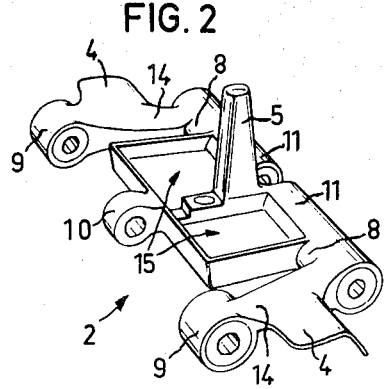
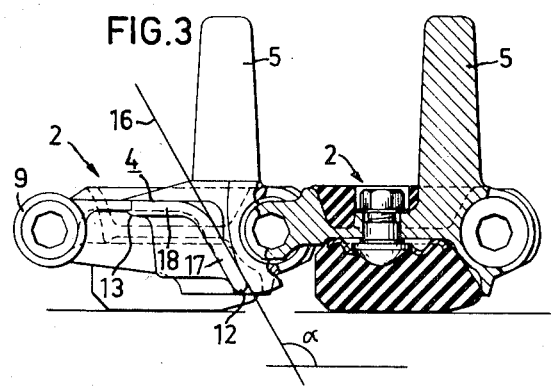

3,721,476
TRACK CHAIN FOR TRACKED VEHICLES
Björn Axel Henning Andersson, Gullanget, Sweden, assignor to AB Haggelund & Soner, Ornskoldsvik, Sweden
Filed Mar. 3, 1971, Ser. No. 120,430
Claims priority, application Sweden, Mar. 31, 1970, 4,389/70
Int. Cl. B62d 55/20
U.S. Cl. 305—35 R
5 Claims

ABSTRACT OF THE DISCLOSURE

The present invention relates to a track chain for tracked vehicles, said chain consisting of track members that are hinged to each other. The object of the invention is to improve the transmission of motive power from the vehicle to the surface travelled on, especially loose surfaces such as snow, or in water. The invention is mainly characterized by blades provided on the free ends of each track member. These blades have a longitudinal axis essentially perpendicular to the direction of motion of the track chain and essentially parallel to a plane through the joint parts of each track member. The blades are also curved in a plane perpendicular to its longitudinal axis, the curvature being, looking at the lower part of the track chain, essentially convex in a basically forward, upward direction as seen in the normal direction of motion of the tracked vehicle, and concave in a basically rearward, downward direction. A tangent plane to the blade's curved surface, near the blade's forward edge, forms an angle $\alpha$ greater than 90° with the normal direction of motion of the tracked vehicle.

---

The present invention relates to a track chain for tracked vehicles where the track chain consists of track members that are hinged to each other.

The object of the present invention is to improve the transmission of the motive power to the surface travelled on.

Since the material from which most track chains are made has a fairly low friction coefficient against common types of surfaces during operation of the tracked vehicle, different methods have been attempted for increasing this friction coefficient. These attempted improvements have mainly been directed to (a) designing the track members with gripping means such as spikes or the like which grip the surface travelled on (see, e.g., U.S. patent specification 2,647,023, the British patent specification 645,415 and the Swedish patent specification 145,905); (b) providing the track chains with pads of rubber or rubber like material (see, e.g., the Swiss patent specification 377,666). The drawback with spikes is that they tend to tear apart the surface, especially with increased track speeds and increased motive power, thus lessening the possible traction.

In types of track known to date, either with spikes or pads or combinations of the two, their motive capacity in water has been based essentially on sheer friction between the track chain and the water since said track chains have been designed for use on firm surfaces only.

The purpose of the present invention is to produce a type of track chain which provides improved mobility when driving on loose surfaces, e.g. on snow, or when swimming in water.

This is achieved by providing the free ends of each track member with blades that are shaped so that they have a longitudinal axis which is essentially perpendicular to the direction of motion of the track and essentially parallel to a plane through the hinging points of each track member, every blade having a curvature in a plane perpendicular to its longitudinal axis. This curvature is, looking at the lower part of the track, essentially convex in a forward, upward direction as seen in the normal direction of motion for the vehicle, and is basically concave in a backward, downward direction. A tangent plane to the curved surface of the blade, near the blade's forward edge, forms an angle greater than 90° with the normal direction of motion of said tracked vehicle.

According to a preferred embodiment, the blades are given a certain predetermined curvature so that the tangent plane to the blade's curved surface, near the blade's forward edge, forms an angle greater than 105° and less than 165° with the normal direction of motion of the tracked vehicle. It also forms an angle near the blade's trailing edge greater than 135° and less than or equal to 180° with said normal direction of motion of the tracked vehicle.

It is particularly advantageous to have the blade, as seen from the side, consist of two essentially plane, uniformly thick blade portions, a front portion and a rear portion that are interconnected and placed angularly relative to each other so that the tangent plane to the front blade portion forms an angle of about 120° with the normal direction of motion of the tracked vehicle, while the tangent plane to the rear blade portion forms a corresponding angle of about 180° with the normal direction of motion of said vehicle. In addition, the forward edge of the front blade portion is situated on a vertical line immediately behind a forward track bolt, and the rear blade portion is situated essentially level with a tangent plane to the top side of the track bolts.

It is also preferable that the blades have an internal distance, in the longitudinal direction of the track chain, of at least the diameter of one track bolt, and that the forward edge of the blade reaches closer to the underside of the track chain than the trailing edge of the blade does; however, not down to the lowest level of said track chain.

By using blades of the above described type, the surface travelled on will be compressed when the vehicle is driven over loose surfaces such as soft earth, snow, etc., thus increasing the bearing capacity. In addition, the blades can grip the surface without tearing it apart, as was often the case before. The latter advantage is obtained by selecting a suitable curvature for the front part of the blade and by limiting the blade's extension vertically down so that wearing of said blade is reduced when driving over hard surfaces. Practical tests, inter alia driving in snow, have shown a considerable improvement in mobility. In water, the blade curvature provides a favourable water flow around and, above all, through the track chain because of the internal spacing between the blades in the longitudinal direction of said track chain which, with its blades, thereby impels a greater quantity of water thus improving the motive capacity significantly.

The invention is clairified below with the help of an embodiment illustrated in the enclosed drawing where FIG. 1 is a perspective view of a type of track chain having blades according to the invention; FIG. 2 is a perspective view of a track member and FIG. 3 is a side view of two interconnected track members, one of which is shown in section.

In FIG. 1, the track chain 1 consists of a number of track members 2 which are hinged together at adjacent edges with the help of track bolts 3. Each free end of each track member 2 is provided with a blade 4. On the centre of its top side or close to its centre, each track member is provided with a guiding member 5 which engages guide notches 6 on the wheels 7. Cog engaging parts 8 are placed in the forward edge of the track member at its outer ends.

Each of the track bolts 3 runs through two outer rear joint parts 9 that lie outside of two forward joint members 11 which, in turn, are separated by a centre rear joint part 10; see FIG. 2. The outer rear joint part 9 and the outer part of the forward joint member 11 on the same side of the centre line of the track member 2 are joined by an arm 14, which integrally forms a blade 4. This blade 4 extends outwards from the centre of the track member so that its longitudinal axis is essentially parallel to the longitudinal direction of the joint parts 9, 10 and 11. Furthermore, the blade is curved in a plane essentially perpendicular to its longitudinal axis so that the forward edge 12 is placed lower than the trailing edge 13, but does not reach down to the lowest level of the track chain; see FIG. 3. The thickness of the blade is basically constant, both between the forward and rear edges (12, resp. 13) and along its span. A tangent plane 16 to the blade surface forms an angle α with the normal direction of motion of the vehicle. As is evident from FIG. 3, the value of α is least at the front edge 12 and greatest at the back edge 13.

As seen from the side, the blade consists of two essentially plane blade portions, a front blade portion 17 and a rear blade portion 18. These blade portions are interconnected and placed angularly relative to each other. The forward edge 12 of the front blade portion 17 lies on a vertical line immediately behind the forward track bolt and the tangent plane 16 to this blade portion forms an angle α of at least 90° with the normal direction of motion of the vehicle. This angle is preferably greater than 105° and less than 165°. In this case, the value of the angle used, 120°, is particularly favourable. The corresponding angle α for the tangent plane 16 to the rear blade portion 18 is preferably greater than 135° and less than, or equal to 180°. A particularly suitable value is 180°, and this is the value used in the present case. The rear blade portion 18 is essentially level with a tangent plane to the topside of the track bolts. In addition, the trailing edge 13 of the rear blade portion 18 is at a certain distance from and in front of the trailing track bolt so that a suitable blade distance in the longitudinal direction of the track is obtained in order to ensure good water flow around and through the track when the vehicle is operating in water.

The horizontal part of the blade is mainly responsible for improving the ultimate bearing resistance on loose surfaces; the task of the inclined part of the blade is basically to obtain a firm hold in the surface travelled upon or to direct the water flow when swimming.

The top and bottom sides of each track member are provided with wearing surfaces of rubber or rubber like material. These wearing surfaces are placed in cavities 15, intended for this purpose, in the top and bottom of each track member.

The shape of the track member and blade can, of course, be varied in a number of ways—e.g., by varying the curvature and thickness distribution of the blade or adapting the internal distances of the blades to each other to suit different work purposes.

What is claimed is:

1. Track chain for tracked vehicles comprising track members which are directly hinged to each other by track bolts, characterized in that the lateral sides of each track member are provided with integral blades to improve mobility when said vehicles are driven over loose surfaces, e.g. snow, or when driven through water, said blades being so shaped that they have a rear portion essentially in the direction of motion of said track chain and essentially parallel to a plane through the joint parts of each track member, each said blade having a curvature in a plane perpendicular to said rearward portion joining the latter with a downwardly extending front portion, said curvature being, looking at the lower part of the track, essentially convex in a basically forward, upward direction as seen in the normal direction of motion of the tracked vehicle, and concave in a basically rearward, downward direction, a tangent plane to said front portion, near the blade's forward edge, forming an angle greater than 90° with the normal direction of motion of said tracked vehicle, the lowest portion of each said blade being above the lowest portion of said chain.

2. Arrangement according to claim 1, characterized in that the said tangent plane forms an angle greater than 105° and less than 165° and a tangent plane to said rear portion near the blade's trailing edge, forms an angle greater than 135° and less than or equal to 180° with the normal direction of motion of said tracked vehicle.

3. Arrangement according to claim 1, characterized in that the blades have a distance from each other, in the longitudinal direction of the track chain, of at least the diameter of one track bolt.

4. Arrangement according to claim 1, characterized in that the blade, as seen from the side, consists of two essentially plane, uniformly thick blade portions, a front portion and a rear portion interconnected and placed in angular relationship with each other so that the tangent plane to the front plate portion forms an angle of about 120° with the normal direction of motion of said tracked vehicle, and so that the tangent plane to the rear blade portion forms a corresponding angle of about 180° with the normal direction of motion of said tracked vehicle.

5. Arrangement according to claim 4, characterized in that the forward edge of the front blade portion is situated on a vertical line immediately behind the forward track bolt, and that the rear blade portion is situated essentially on the same level as a tangent plane to the top side of the track bolts.

References Cited

UNITED STATES PATENTS

| | | | |
|---|---|---|---|
| 3,537,760 | 11/1970 | Kimura | 305—54 |
| 3,357,750 | 12/1967 | Reynolds | 305—42 X |
| 1,877,135 | 9/1932 | Knox | 305—58 |

FOREIGN PATENTS

| | | | |
|---|---|---|---|
| 720,733 | 12/1931 | France | 305—58 |
| 584,107 | 11/1924 | France | 305—52 |
| 634,058 | 10/1927 | France | 305—1 |

RICHARD J. JOHNSON, Primary Examiner

U.S. Cl. X.R.

305—58